United States Patent
Lin et al.

(10) Patent No.: US 11,024,252 B2
(45) Date of Patent: Jun. 1, 2021

(54) POWER-SAVING DRIVING CIRCUIT FOR DISPLAY PANEL AND POWER-SAVING DRIVING METHOD THEREOF

(71) Applicant: Novatek Microelectronics Corp., Hsinchu (TW)

(72) Inventors: Li-Tang Lin, Hsinchu (TW); Keko-Chun Liang, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 112 days.

(21) Appl. No.: 15/961,896

(22) Filed: Apr. 25, 2018

(65) Prior Publication Data
US 2018/0240435 A1   Aug. 23, 2018

Related U.S. Application Data

(63) Continuation-in-part of application No. 14/492,079, filed on Sep. 22, 2014, now Pat. No. 10,403,225,
(Continued)

(30) Foreign Application Priority Data

Jun. 29, 2012   (TW) ................................ 10112347.8

(51) Int. Cl.
*G09G 3/20* (2006.01)
*G09G 3/36* (2006.01)
(Continued)

(52) U.S. Cl.
CPC .............. *G09G 5/001* (2013.01); *G09G 3/20* (2013.01); *H04N 7/24* (2013.01); *G09G 3/3688* (2013.01);
(Continued)

(58) Field of Classification Search
None
See application file for complete search history.

(56) References Cited

U.S. PATENT DOCUMENTS 5,657,037 A * 8/1997 Okada ...................... G09G 3/20
345/78
6,160,533 A * 12/2000 Tamai .................. G09G 3/2011
345/89
(Continued)

FOREIGN PATENT DOCUMENTS

CN   101339752   1/2009
CN   101452676   6/2009
(Continued)

OTHER PUBLICATIONS

Definition of alternatively , downloaded from https://www.thefreedictionary.com/alternatively, Apr. 30, 2020 (Year: 2020).*
(Continued)

*Primary Examiner* — Dorothy Harris
(74) *Attorney, Agent, or Firm* — JCIPRNET

(57) ABSTRACT

A power-saving driving circuit for a display panel is provided. The display panel includes a pixel array including a plurality of data lines. The data lines are grouped into a plurality of pixel regions according to a scan time. Each of the pixel regions has a plurality of pixels. The power-saving driving circuit includes at least one source driver. The source driver respectively supplies a driving voltage to the pixels on at least one of the data lines. The driving voltage supplied by the source driver to each of the pixel regions has a varying driving capability determined according to a pulse width and/or a rising slope of the driving voltage. The pulse width and/or the rising slope of the driving voltage is larger when the driving voltage is supplied for driving the pixels in the pixel region farther from the source driver.

2 Claims, 15 Drawing Sheets

Related U.S. Application Data which is a continuation-in-part of application No. 13/751,159, filed on Jan. 28, 2013, now abandoned.

(51) Int. Cl.
   *G09G 5/00* (2006.01)
   *H04N 7/24* (2011.01)
   *H04N 21/443* (2011.01)

(52) U.S. Cl.
   CPC ..... *G09G 3/3696* (2013.01); *G09G 2310/027* (2013.01); *G09G 2310/066* (2013.01); *G09G 2310/08* (2013.01); *G09G 2320/0223* (2013.01); *G09G 2330/021* (2013.01); *G09G 2330/023* (2013.01); *G09G 2330/028* (2013.01); *H04N 21/4436* (2013.01)

(56) References Cited

U.S. PATENT DOCUMENTS

| | | | |
|---|---|---|---|
| 6,195,077 B1* | 2/2001 | Gyouten | G09G 3/3692 345/99 |
| 6,307,681 B1 | 10/2001 | Aoki et al. | |
| 7,164,405 B1 | 1/2007 | Jeong et al. | |
| 7,218,333 B2* | 5/2007 | Choi | G09G 3/2014 345/204 |
| 7,427,975 B2 | 9/2008 | Cho et al. | |
| 7,973,686 B2 | 7/2011 | Nishimura | |
| 2002/0021271 A1 | 2/2002 | Sakamoto | |
| 2003/0122759 A1* | 7/2003 | Abe | G09G 3/22 345/89 |
| 2004/0070579 A1* | 4/2004 | Kurihara | G09G 3/2011 345/204 |
| 2004/0104876 A1 | 6/2004 | Takeda et al. | |
| 2004/0150488 A1 | 8/2004 | Cho et al. | |
| 2005/0062508 A1 | 3/2005 | Nishimura | |
| 2005/0162372 A1* | 7/2005 | Hashimoto | G09G 3/3648 345/99 |
| 2007/0159441 A1* | 7/2007 | Yang | G09G 3/3677 345/99 |
| 2008/0018586 A1* | 1/2008 | Yang | G09G 3/3648 345/100 |
| 2008/0043046 A1* | 2/2008 | Hong | G09G 3/3216 345/691 |
| 2009/0009498 A1 | 1/2009 | Nishimura | |
| 2009/0225072 A1* | 9/2009 | Mizukoshi | G09G 3/3233 345/214 |
| 2009/0273591 A1 | 11/2009 | Jinta | |
| 2010/0149170 A1 | 6/2010 | Huang et al. | |
| 2011/0057915 A1 | 3/2011 | Sheu et al. | |
| 2012/0212474 A1 | 8/2012 | Hwang et al. | |
| 2013/0176318 A1 | 7/2013 | Dunn et al. | |

FOREIGN PATENT DOCUMENTS

| | | |
|---|---|---|
| CN | 102456331 | 5/2012 |
| JP | 2009122390 | 6/2009 |
| TW | 200816130 | 4/2008 |
| TW | 200826026 | 6/2008 |
| TW | 201118836 | 6/2011 |

OTHER PUBLICATIONS

Hui, Tutorial Basic—Pulse Width Modulation, pp. 1-13, Jan. 2012 (Year: 2012).*
Altera, Controlling analog output from a digital CPLD using PWM, White Paper, Nov. 2008, ver. 1.0, pp. 1-5. (Year: 2008).*

\* cited by examiner

POWER-SAVING DRIVING CIRCUIT FOR DISPLAY PANEL AND POWER-SAVING DRIVING METHOD THEREOF

CROSS-REFERENCE TO RELATED APPLICATION

This application is a continuation-in-part application of and claims the priority benefit of a prior application Ser. No. 14/492,079, filed on Sep. 22, 2014. The prior application Ser. No. 14/492,079 is a continuation-in-part application of and claims the priority benefit of a U.S. application Ser. No. 13/751,159, filed on Jan. 28, 2013, which claims the priority benefit of Taiwan application serial no. 101123478, filed on Jun. 29, 2012. The entirety of each of the above-mentioned patent applications is hereby incorporated by reference herein and made a part of this specification.

BACKGROUND OF THE INVENTION

1. Field of the Invention

The invention relates to a display apparatus and a driving method for the display apparatus.

2. Description of Related Art

In a conventional display panel (for example, a liquid crystal display (LCD), when data is input to the data lines, in order to allow those pixels farther away from the source driver to achieve a proper voltage level for displaying data, the driving voltage output by the source driver should have an adequate driving capability. If the driving capability is inadequate, because the driving voltage attenuates on the date lines before it reaches the pixels farther away from the source driver, the gray level actually displayed by each pixel is different from the input data.

In addition, because the pixels on a same data line would have different voltage levels to meet the demand of displayed image, the load on the data line is repeatedly charged/discharged. Such charging/discharging operations also increase the power consumption of the source driver.

Therefore, how to reduce the power consumption of the source driver should be considered in product design.

SUMMARY OF THE INVENTION

In embodiments of the invention, the power consumed by loads on data lines is reduced without sacrificing the display quality of a liquid crystal display (LCD).

An embodiment of the invention provides a power-saving driving circuit for a display panel. The display panel includes a pixel array including a plurality of data lines. The data lines are grouped into a plurality of pixel regions according to a scan time. Each of the pixel regions has a plurality of pixels. The power-saving driving circuit includes at least one source driver. The source driver respectively supplies a driving voltage to the pixels on at least one of the data lines. The driving voltage supplied by the source driver to each of the pixel regions has a varying driving capability determined according to a pulse width and/or a rising slope of the driving voltage. The pulse width and/or the rising slope of the driving voltage is larger when the driving voltage is supplied for driving the pixels in the pixel region farther from the source driver.

An embodiment of the invention provides a power-saving driving method for a display panel, adapted to drive a pixel array. The pixel array includes a plurality of data lines. The power-saving driving method includes: grouping the data lines into a plurality of pixel regions according to a scan time, where each of the pixel regions has a plurality of pixels; and respectively supplying a driving voltage to the pixels on each of the data lines by using a plurality of source drivers. The driving voltage supplied by the source drivers to each of the pixel regions has a varying driving capability determined by a pulse width and/or a rising slope of the driving voltage. The pulse width and the rising slope of the driving voltage supplied for driving the pixels in the pixel regions which are farthest from the source driver is larger.

In another aspect, a power-saving driving method is also proposed for a display panel, adapted to drive a pixel array, wherein the pixel array includes a plurality of driving lines divided into a plurality of pixel regions including a first region and a second region, and the driving lines are driven by at least one display driver. The power-saving driving method including: when the at least one display driver charges/discharges a first pixel region of the driving lines farther away from the at least one display driver, a first charge driving capability of an output of the at least one display driver is maintained to allow the driving lines to have a proper level of charges at the first pixel region. When the at least one display driver charges/discharges a second pixel region of the driving lines nearer the at least one display driver, a second charge driving capability of the output of the at least one display driver is maintained to allow the driving lines to have a proper level of charges at the second pixel region. The second charge driving capability is weaker than the first charge driving capability.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
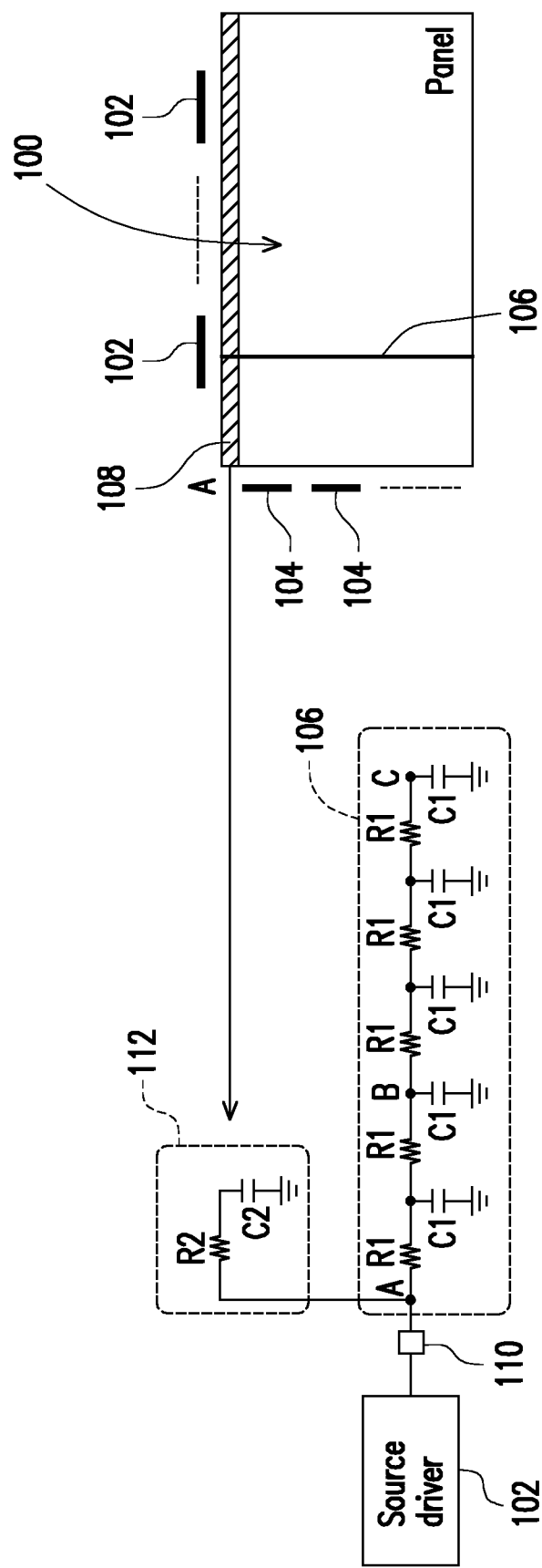
FIG. 1 is a diagram illustrating the load on a data line of a liquid crystal display (LCD) according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

In the invention, the loads of data lines corresponding to different scan positions are analyzed in detail, and a display apparatus utilizing a power-saving driving mechanism is provided based on the analysis result to reduce the power consumption and achieve an energy saving effect.

FIG. 1 is a diagram illustrating the load on a data line of a liquid crystal display (LCD) according to an embodiment of the invention. Referring to FIG. 1, a pixel array 100 is disposed on the display panel. The pixel array 100 is controlled by a plurality of source drivers 102 and a plurality of gate drivers 104. The pixel array 100 is usually a 2-dimensional (M×N) pixel array, and in which the pixels along the vertical direction constitute a plurality of data lines 106, and the pixels along the horizontal direction constitute a plurality of scan lines 108. The scan lines 108 are controlled by the gate drivers 104 to sequentially start the pixels. Meanwhile, the source drivers 102 supply driving voltages corresponding to desired gray levels to the pixels via the data lines 106 to display image data. An image is displayed on the display panel after the scanning of one frame is completed.

Regarding one data line 106 in the equivalent circuit, the load equivalent circuit 112 of a pixel on the data line 106 includes an equivalent resistor R2 of a transistor switch and a storage capacitor C2 for storing pixel data voltage. Based on the resolution design of M×N, the data line 106 has N pixels. Taking a five-stage equivalent load circuit as an example, resistance for each single stage load on the data line 106 is indicated as R1, and the parasitic capacitance for each single stage load on the data line 106 is indicated as C1.

Referring to FIG. 1, the scan line 108 charges/discharges the pixel A near the source driver 102. The source driver 102 outputs a driving voltage (i.e., a data voltage) to the data line 106 through a bump 110. A pixel at node A started by the scan line 108 is denoted with diagonal lines on the display panel, and which turns on the transistor switch of the corresponding pixel. Meanwhile, the driving voltage supplied to the pixel by the source driver 102 is corresponding to the data of the pixel. The voltage corresponding to the data of the pixel needs to charge/discharge the storage capacitor C2.

Figure 2:
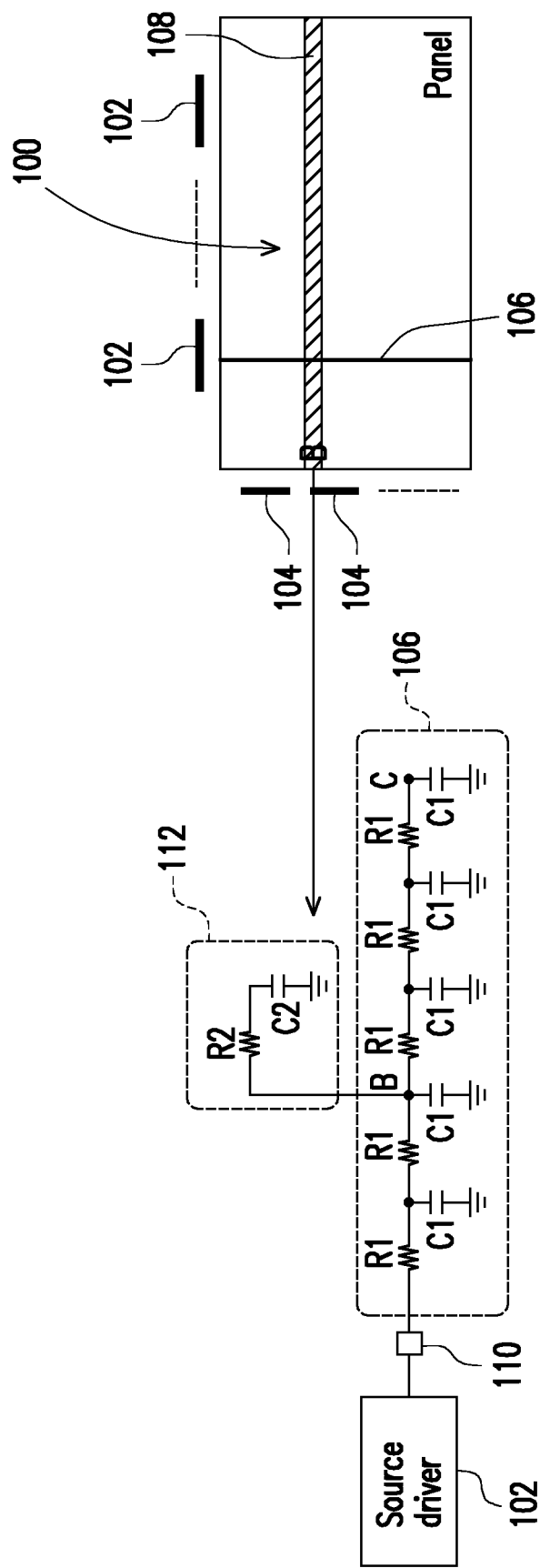
FIG. 2 is a diagram illustrating a LCD scanning mechanism according to an embodiment of the invention.
Figure 3:
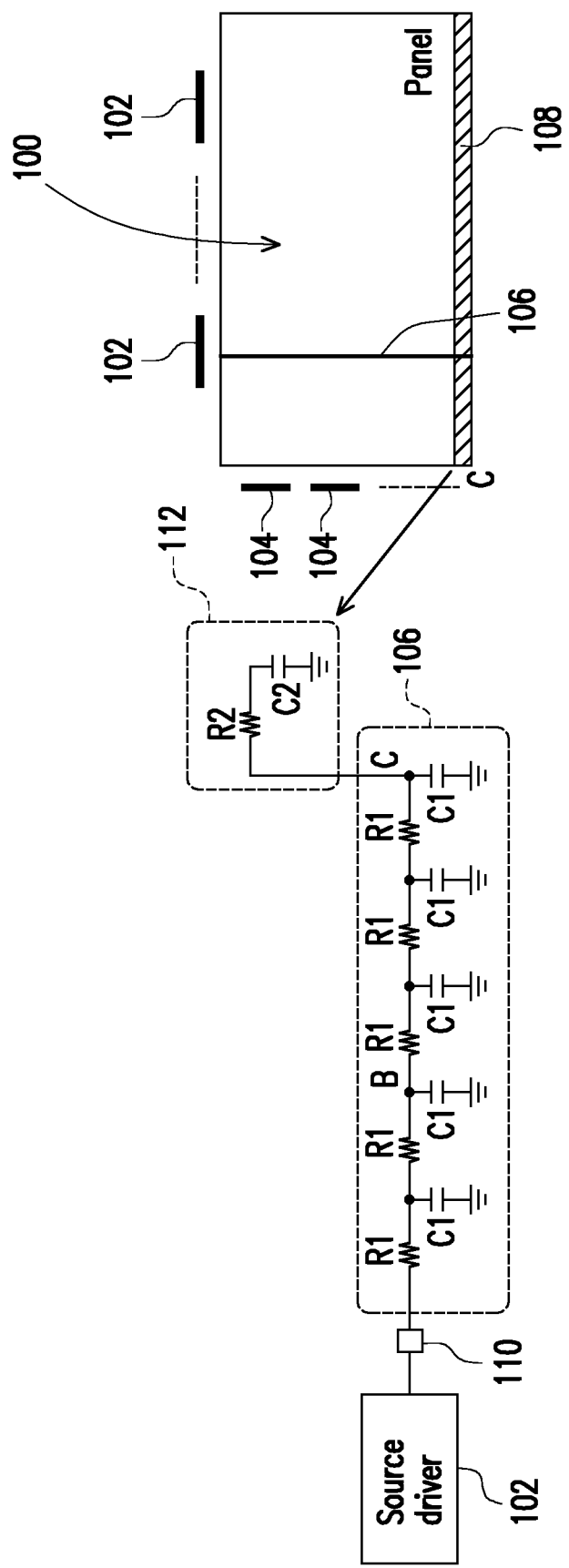
FIG. 3 is a diagram illustrating a LCD scanning mechanism according to an embodiment of the invention.

Regarding pixels at different positions on each scan line 108, the storage capacitors C2 are charged/discharged in the same way. In FIG. 2, a pixel at node B on the data line 106 started by the scan line 108 is denoted with diagonal lines on the display panel. The node B represents a pixel farther away from the source driver 102. In FIG. 3, a pixel at node C on the data line 106 started by the scan line 108 is denoted with diagonal lines on the display panel. The node C represents a pixel farthest away from the source driver 102.

On the display panel of the LCD, the parasitic capacitance C1 of each stage on the data line 106 is usually greater than the storage capacitance C2 of a single pixel. Thus, in order to ensure that the pixels at the nodes A, B, and C have voltages at proper levels, the outputs of the source drivers 102 have to have adequate charge driving capabilities and should be able to fully charge the resistors R1 and capacitors C1 of all five stages on the data lines 106 without considering power consumption. The voltages supplied to the pixels at nodes A, B, and C may be very different due to different pixel data or polarities. As a result, the loads on the data lines 106 may be repeatedly charged/discharged, which will drastically increase the power consumption of the source drivers 102.

In an embodiment of the invention, when a source driver charges/discharges a far pixel, the output of the source driver maintains a regular charge driving capability so that the pixel can be properly charged under the impact of the load on the data line. When the source driver charges/discharges a near pixel, the output of the source driver maintains a lower charge driving capability, or a smaller charge/discharge area is assumed, so that only the load on the near data line is charged with the desired amount of charges and the storage capacitor of the near pixel achieves voltage at a proper level while the loads on those far data lines are not fully charged. Regarding the five-stage RC equivalent load circuits on a data line, when a lower charge driving capability is adopted (for example, the parasitic capacitor C1 of the first stage equivalent load circuit is charged to a desired voltage level), the equivalent load circuits of the other stages may not be fully charged. However, since the pixels of the first stage equivalent load circuit achieve the desired voltage level, the display effect of the pixels of the first stage equivalent load circuit is not affected even though the pixels of the rest equivalent load circuits are not fully charged. Compared to the situation that equivalent load circuits in all five stages are fully charged, less power is consumed since the far parasitic capacitors on the data lines consume less power. Thereby, when near pixels are driven, the power consumed by far loads is reduced, and the power consumed on the data lines for data conversion or polarity transformation is also reduced, so that the power consumption of the LCD is reduced. Namely, the source drivers maintain weaker charge driving capabilities when near pixels are driven so that the power consumption is reduced.

Below, the charging state of the data lines when pixels at different positions are charged/discharged will be described.

Figure 4:
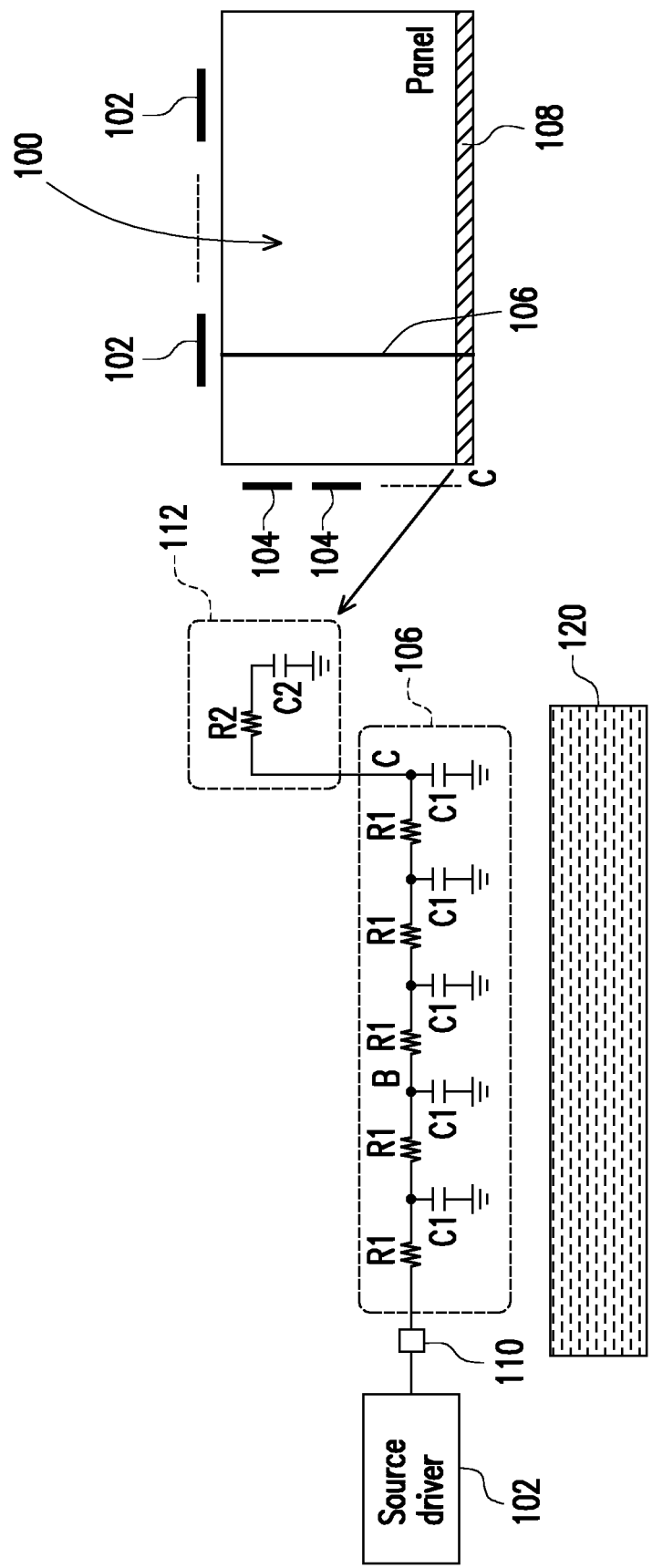
FIG. 4 is a diagram illustrating how a farther load on a data line is charged according to an embodiment of the invention.

FIG. 4 is a diagram illustrating how a farther load on a data line is charged according to an embodiment of the invention. Referring to FIG. 4, when data is written to pixels at node C on the data lines, all the parasitic capacitors C1 of the data lines need to be fully charged in order to allow the pixels at the node C to have a proper voltage level. The charge state is as shown by the state pattern 120. All the pixels on a data line 106 need to be fully charged to avoid affecting the voltage on the storage capacitors C2 of the pixels. Namely, the source drivers need to maintain a strong driving capability to achieve the situation mentioned above.

Assuming that the last pixels are at the node C, the driving capability need to be the strongest (i.e., the regular driving capability applicable to all the pixels in a general design). However, power is wasted if data is written to the pixels at the node A with such regular driving capability.

Figure 5:
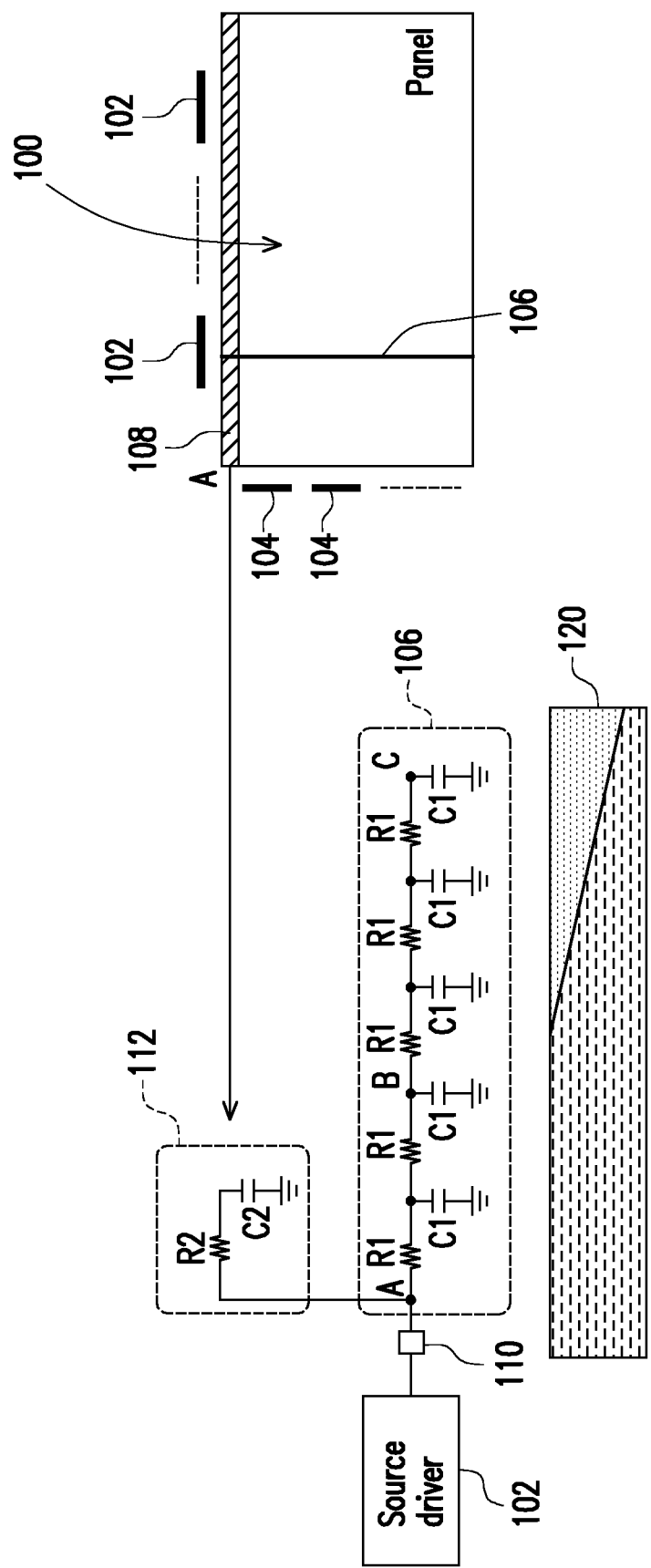
FIG. 5 is a diagram illustrating how a nearer load on a data line is charged according to an embodiment of the invention.

FIG. 5 is a diagram illustrating how a nearer load on a data line is charged according to an embodiment of the invention. Referring to FIG. 5, when data is written to a pixel at the node A on a data line (for example, the first pixel), only the parasitic capacitor C1 and the storage capacitor C2 at the node A on the data line need to be fully charged. The display of the pixel at the node A is not affected regardless of whether those pixels after node A (for example, the capacitors at the node B and the node C) are fully charged.

The charge state is as shown by the state pattern 120. When near pixels are charged/discharged, a weaker driving capability can be maintained to fully charged the parasitic capacitors C1 and the storage capacitors C2 of the load circuits at the node A on the data lines as long as the pixels at the node A on the data lines are fully charged. However, the parasitic capacitors C1 after the node A (for example, at the node B or the node C) can be partially charged (the incomplete state shown by the state pattern 120) to reduce the power consumption caused by data difference or polarity difference. Herein even though the parasitic capacitors C1 at the node B or the node C are not fully charged, the display of the pixels at the node A is not affected even though the parasitic capacitors C2 of the pixels at the node B or the node C are not fully charged.

The charge driving capability can be changed in many ways, such as the technique described in detail later on with reference to FIGS. 9-11. Below, the data lines are grouped into three pixel regions corresponding to aforementioned nodes A, B, and C. However, the number of the pixel regions is not limited thereto, and there may be two or more than three pixel regions. The number of pixels in each pixel region is determined according to the number of the pixel regions. Namely, pixels on the data lines are grouped into a plurality of pixel regions. Below, for the convenience of description, each pixel region is denoted as a node. In the present embodiment, pixels in three pixel regions are denoted as nodes A, B, and C.

Figure 6:
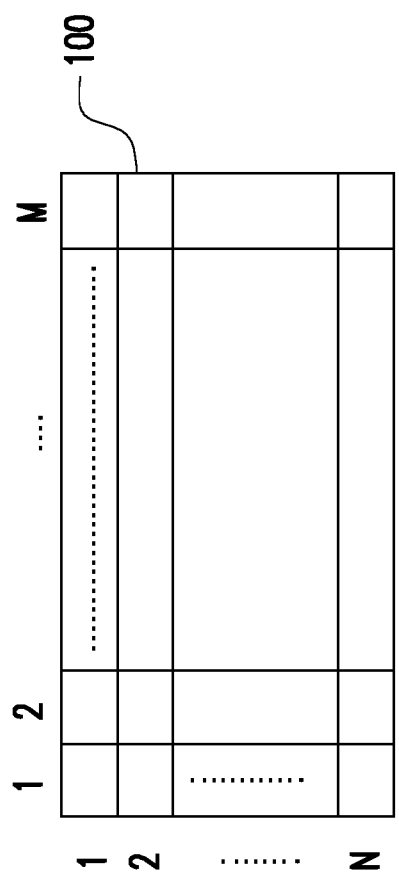
FIG. 6 is a diagram of a pixel array according to an embodiment of the invention.

FIG. 6 is a diagram of a pixel array according to an embodiment of the invention. Referring to FIG. 6, regarding an M×N pixel array 100, corresponding pixels can be denoted with 2D array elements. M and N are positive integers, and M×N is generally referred to as a resolution. A color pixel may be composed of three sub pixels of primitive colors, which is well known by those skilled in the art therefore will not be explained herein. In an embodiment of the invention, there are N pixels on each data line, and the pixels are grouped into three equal pixel regions (i.e., each pixel region has about N/3 pixels). If there are L pixel regions (L is greater than or equal to 2), each pixel regions has about N/L pixels. In the embodiment described above, L=3. However, the pixel regions may not be equal to each other. Namely, the numbers of pixels in the pixel regions may not be approximately the same.

The pixel region corresponding to a pixel to be written can be identified according to a control signal YDIO of a frame, according to the scan timings of the gate drivers, or according to the position of the pixel on a data line. Therefore, the pixel region corresponding to the pixel can be determined according to the number of pixels on the entire frame.

Figure 7:
FIG. 7 is a diagram illustrating how to calculate the position of a currently scanned pixel according to a control signal YDIO according to an embodiment of the invention.

FIG. 7 is a diagram illustrating how to calculate the position of a currently scanned pixel according to the control signal YDIO according to an embodiment of the invention. Referring to FIG. 7, data of a frame is input after one pulse of the control signal YDIO, in which M×N pixels are input as a string. Thus, the position and the corresponding data line, and accordingly the corresponding pixel region, of a pixel can be determined according to the number of the pixel. The source driver driving the data line outputs a signal of different driving capability according to the distance of the pixel region.

Figure 8:
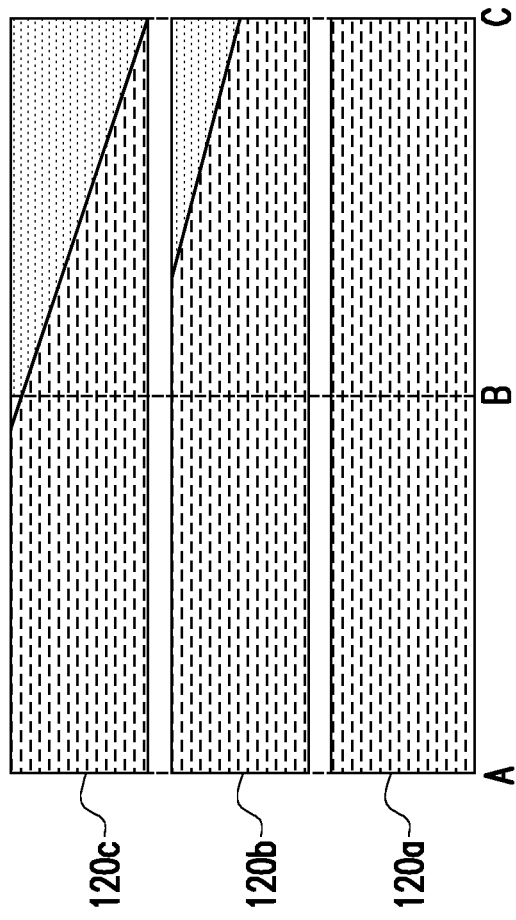
FIG. 8 is a diagram illustrating the charging states of three driving capabilities corresponding to three nodes A, B, and C according to an embodiment of the invention.

FIG. 8 is a diagram illustrating the charging states of three driving capabilities corresponding to three nodes A, B, and C according to an embodiment of the invention. Referring to FIG. 8, the state pattern 120a shows a charge state with the highest driving capability, in which the pixels at the node C are driven. Because the pixels at the node C are the farthest pixels, when the parasitic capacitors C1 and the storage capacitors C2 of the pixels at the node C are fully charged, the parasitic capacitors C1 and the storage capacitors C2 of the pixels at the nodes A and B are also fully charged.

The state pattern 120b shows a charge state with a medium driving capability. The strength of the driving capability is just adequate for properly driving the pixels at the node B. Thus, the parasitic capacitors C1 and the storage capacitors C2 of the pixels at the node C need not be charged at the same time to the voltage needed by the pixels at the node B for the pixels at the node B to display data properly. Herein the parasitic capacitors C1 and the storage capacitors C2 of the pixels at the node A are already fully charged. However, power will be wasted if a high driving capability is adopted to maintain the charge state of the pixels at the node C as that shown by the state pattern 120a.

The state pattern 120c shows a charge state with a low driving capability. The strength of the driving capability is just adequate for properly driving the pixels at the node A. Thus, the pixels at the nodes B and C need not be fully charged along with the pixels at the node A at the same time for the pixels at the node A to display data properly. Therefore, pixels in the nearest pixel regions on the data lines display data properly, while the rest of the pixels, regardless of whether the parasitic capacitors C1 and the storage capacitors C2 thereof are fully charged or not, won't affect the display of the pixels at the node A. Power will be wasted if a high driving capability is adopted to maintain the charge states of the pixels at the node B and the node C depicted by the state pattern 120a.

Based on the driving mechanism described above or illustrated in FIG. 8, the driving capability of a source driver should be adjusted to achieve a power-saving effect.

Below, how the driving capability is adjusted will be explained with reference to embodiments of the invention. However, these embodiments are not intended to limit the scope of the invention.

Figure 9:
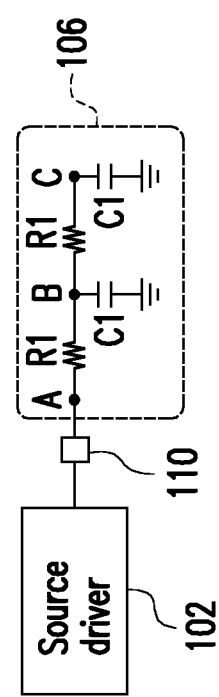
FIG. 9 is a diagram illustrating a mechanism of classifying a driving capability based on the rising or falling rate of the rising edge of a driving voltage signal according to an embodiment of the invention.
Figure 9:
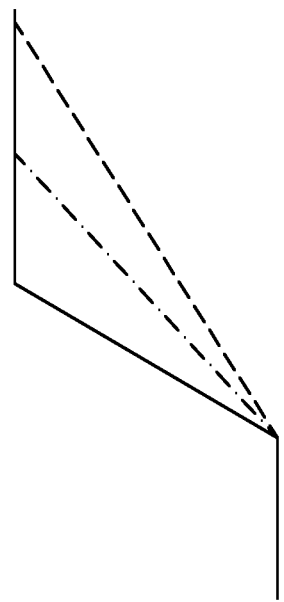

FIG. 9 is a diagram illustrating a mechanism of classifying a driving capability based on the increasing or decreasing rate of the rising edge of a driving voltage signal according to an embodiment of the invention. FIG. 9 illustrates the waveform of the driving voltage signal output by a source driver. Regarding the charging characteristic of a RC circuit, the rising speed or falling rate of its voltage is determined by different circuit design conditions, and the power consumed by the RC circuit varies with the rising or falling rate of the voltage. To be specific, the higher the rising speed is, the more power is consumed. The rising edge of the dashed line has a relatively slow rising speed and thus can be used for driving the pixels at the node A. The rising edge of the dotted line has an intermediate rising speed and therefore can be used for driving the pixels at the node B. The rising edge of the solid line has the fastest rising speed and therefore can be used for driving the pixels at the node C.

Figure 10:
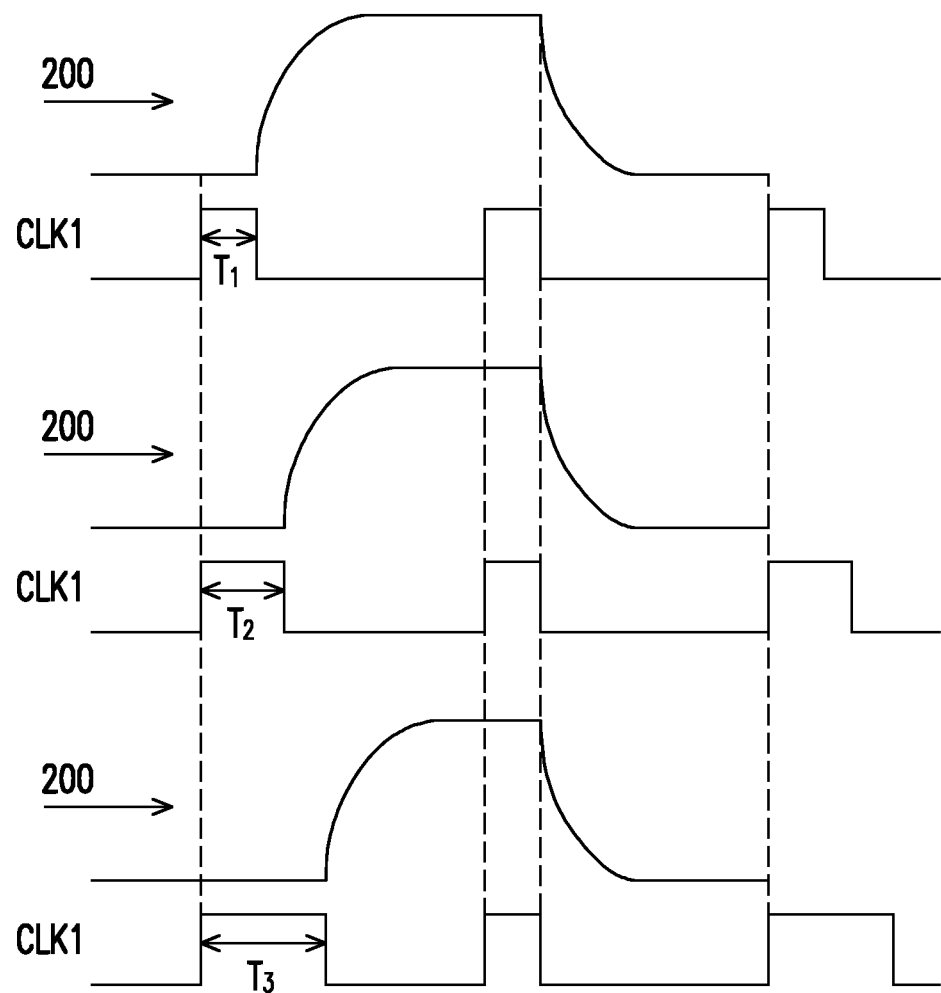
FIG. 10 is a diagram illustrating a mechanism of classifying a driving capability based on charge areas according to an embodiment of the invention.

FIG. 10 is a diagram illustrating a mechanism of classifying a driving capability based on charge areas according to an embodiment of the invention. Referring to FIG. 10, regarding the waveform of the driving voltage signal output by a source driver, if the rising speed thereof is not changed, the signal width can be changed. As a result, the charge area (product of pulse width and voltage) is adjusted, and accordingly the driving capability is changed.

Generally, the driving voltage signal 200 output by a source driver is generated according to a clock signal CLK1. For example, the high and low levels of the driving voltage signal 200 are sequentially changed according to the falling edges of the clock signal CLK1. By changing the pulse widths T1, T2, and T3 of the clock signal CLK1, the trigger time for the high level of the driving voltage signal 200 is changed, and accordingly the signal width is changed. In an embodiment with three pixel regions, the pulse widths T1, T2, and T3 has a relationship such as T1<T2<T3. The pulse width T1 may be the pulse width of the original clock signal CLK1, and the charge area thereof is the largest. Thus, the pulse width T1 is used for driving the pixels in the farthest pixel regions.

The pulse width T2 is greater than the pulse width T1 according to the actual design. Thus, the charge area thereof is reduced and the pulse width T2 is used for driving the pixels at the node B. Herein the storage capacitors and the parasitic capacitors of the pixels at the node C need not be fully charged for the pixels at the node B to display data properly. Due to the decrease in the charge area, power consumption is reduced.

The pulse width T3 is greater than the pulse width T2 according to an actual design in practice. Thus, the charge area is further reduced and the pulse width T3 is used for driving the pixels at the node A. Herein, the parasitic capacitors and storage capacitors of the pixels in the pixel regions corresponding to the nodes B and C need not to be fully charged for the pixels at the node A to display data properly. Due to the decrease in the charge area, power consumption is reduced.

Figure 11:
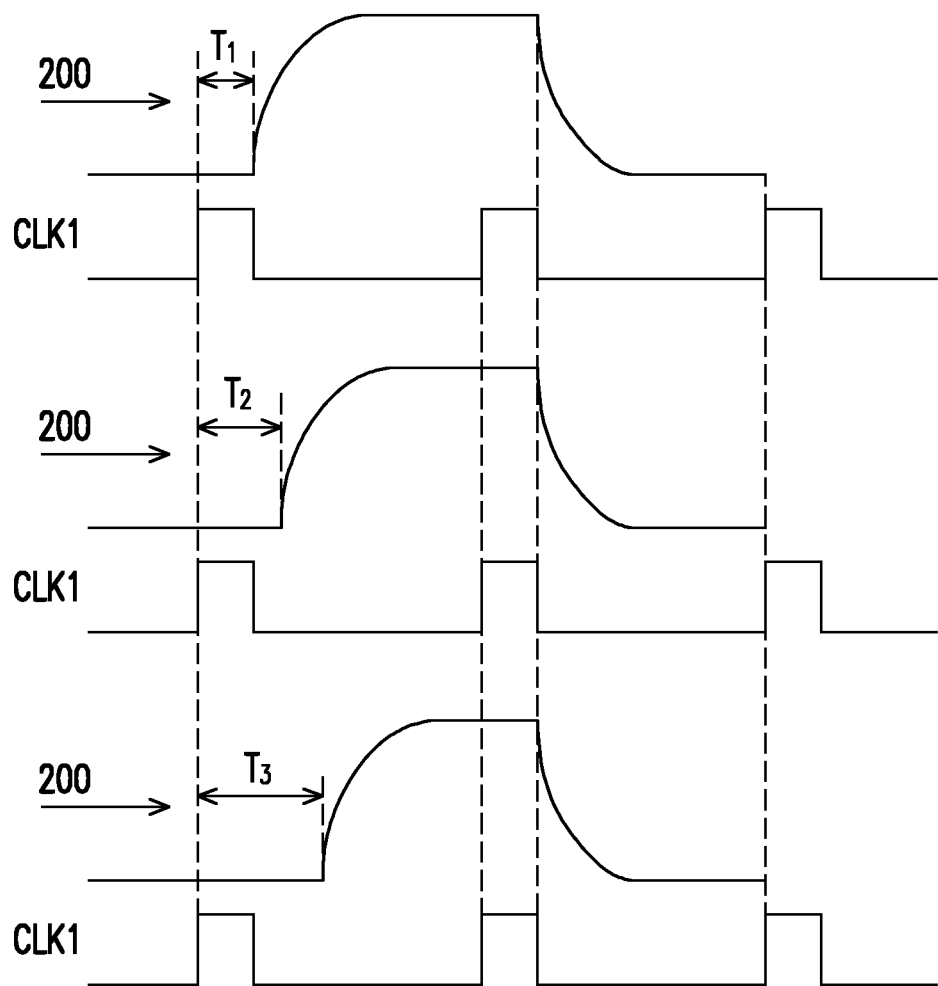
FIG. 11 is a diagram illustrating a mechanism of classifying a driving capability based on charge areas according to an embodiment of the invention.

FIG. 11 is a diagram illustrating a mechanism of classifying a driving capability based on charge areas according to an embodiment of the invention. Referring to FIG. 11, when the mechanism of changing the charge area is adopted and the rising speed of the driving voltage signal 200 is not changed (as shown in FIG. 10), the change of the signal width can be accomplished through time delay. In the present embodiment, the pulse width of the clock signal CLK1 maintains its original width, but the triggering of the driving voltage signal 200 output by the source driver is delayed. The delay time is set according to the relationship of the pulse widths T1, T2, and T3 (T1<T2<T3). However, this mechanism is accomplished through delay triggering, and the effect is as shown in FIG. 11.

The change of the charge area is not only accomplished through the techniques illustrated in FIG. 10 and FIG. 11. Instead, it may also be accomplished according to a different signal or through a different mechanism.

Figure 12:
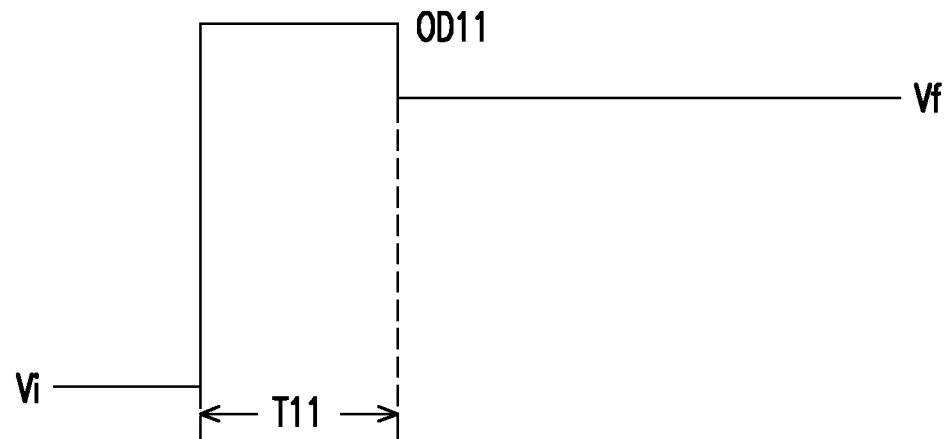
FIG. 12 is a voltage diagram illustrating an overdrive mechanism according to an embodiment of the invention.
Figure 13:
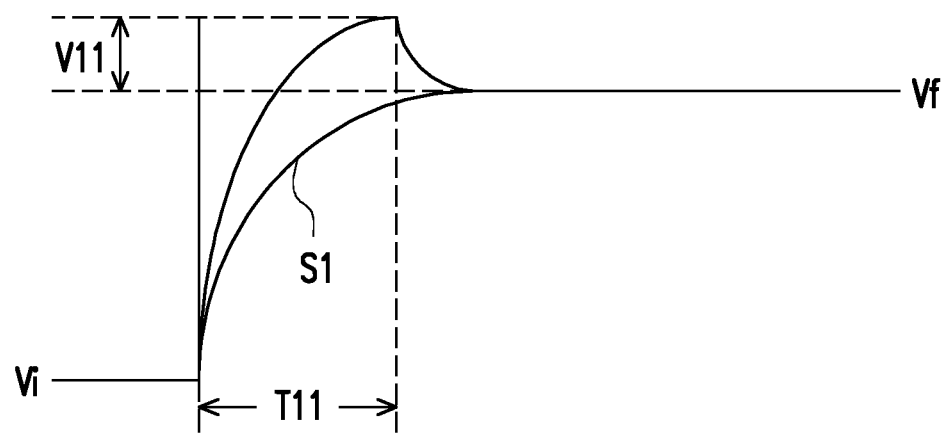
FIG. 13 is a voltage diagram illustrating an actual driving voltage signal applied on a data line using the overdrive mechanism depicted in FIG. 12.

For example, in order to facilitate charging and discharging of the loads on the data lines of a pixel array, an overdrive mechanism may be adopted. FIG. 12 is a voltage diagram illustrating an overdrive mechanism according to an embodiment of the invention. FIG. 13 is a voltage diagram illustrating an actual driving voltage signal applied on a data line using the overdrive mechanism depicted in FIG. 12. With reference to FIG. 12, when a final driving voltage Vf is higher than an initial driving voltage Vi, a first overdrive voltage OD1 is configured to be higher than the final driving voltage Vf. A driving voltage signal supplied by a source driver has the first overdrive voltage OD1 for a first period of time T11. That is, after the first period of time T11, the source driver then outputs the driving voltage signal with the final driving voltage Vf. As shown in FIG. 13, the overdrive mechanism is applied on a data line of a pixel array so as to supply the driving voltage signal to a pixel of the pixel array, in which a voltage difference V11 exists between the first overdrive voltage OD11 and the final driving voltage Vf applied to the data line. As the resistance and capacitance values on the loads of a data line become larger, the actual voltage waveform applied on the pixels approaches the smooth bottom curve S1 shown in FIG. 13, and thereby the pixel array can achieve enhanced refresh performance.

Figure 14:
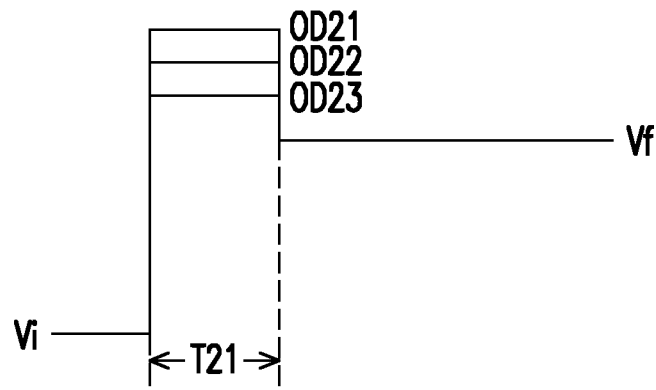
FIG. 14 is a voltage diagram illustrating another overdrive mechanism based on distance according to an embodiment of the invention.
Figure 15:
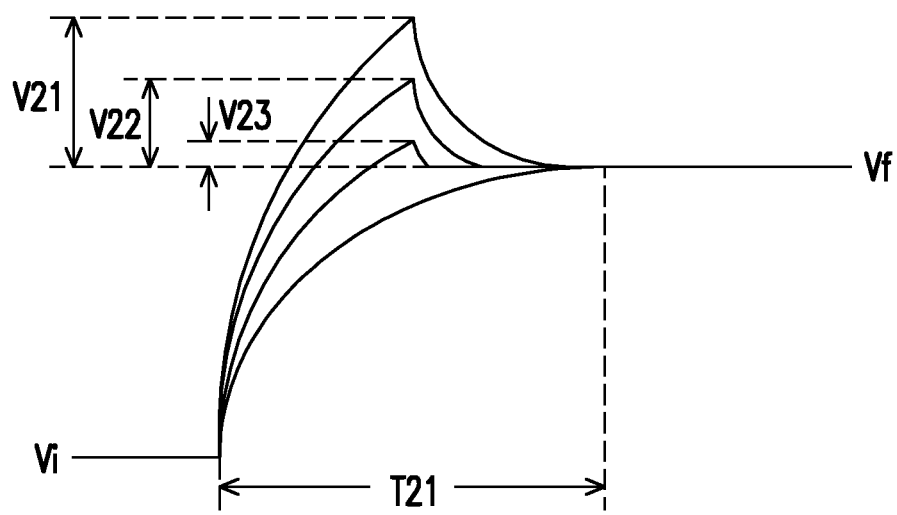
FIG. 15 is a voltage diagram illustrating an actual driving voltage signal applied on a data line using the overdrive mechanism depicted in FIG. 14.

It should be noted that the overdrive mechanism may also be based on distance. FIG. 14 is a voltage diagram illustrating another overdrive mechanism based on distance according to an embodiment of the invention. FIG. 15 is a voltage diagram illustrating an actual driving voltage signal applied on a data line using the overdrive mechanism depicted in FIG. 14. In one example, referring to FIG. 14, a driving voltage signal supplied by a source driver may be configured to have a plurality of overdrive voltages (such as OD21-OD23) according to positions of pixels in a pixel array, and the voltage level of overdrive voltage (such as OD21-OD23) is varied according a position of the receiving pixel in the pixel array.

In specifics, the driving voltage signal supplied by the source driver may be configured to have a first driving voltage OD21 for a first period of time T21, so as to drive the pixels in the farthest distance from the source driver, such as at node C of FIG. 1. The driving voltage signal supplied by the source driver may be configured to have a first overdrive voltage OD22 for the first period of time T21, so as to drive the pixels in the distance between farthest distance and nearest distance from the source, such as at node B of FIG. 1. The driving voltage signal supplied by the source driver may be configured to have a first overdrive voltage OD23 for the first period of time T21, so as to drive the pixels in the nearest distance from the source, such as at node A of FIG. 1.

As shown in FIG. 15, the overdrive mechanism is applied on a data line of the pixel array, in which a voltage difference V21 exists between the first overdrive voltage OD21 and the final driving voltage Vf, a voltage difference V22 exists between the second overdrive voltage OD22 and the final driving voltage Vf, and a voltage difference V23 exists between the first overdrive voltage OD23 and the final driving voltage Vf applied to the data line. In other words, a voltage difference (such as V21-V23) between the first overdrive voltage (such as OD21-OD23) and the final driving voltage Vf is getting lower as getting closer the first source driver, and the voltage difference (such as V21-V23) is getting higher as getting farther away from the first source driver. As the resistance and capacitance values on the loads of a data line become larger, the actual voltage waveform applied on the pixels approaches the smooth bottom curve shown in FIG. 15, and thereby the pixel array can achieve enhanced refresh performance.

Figure 16:
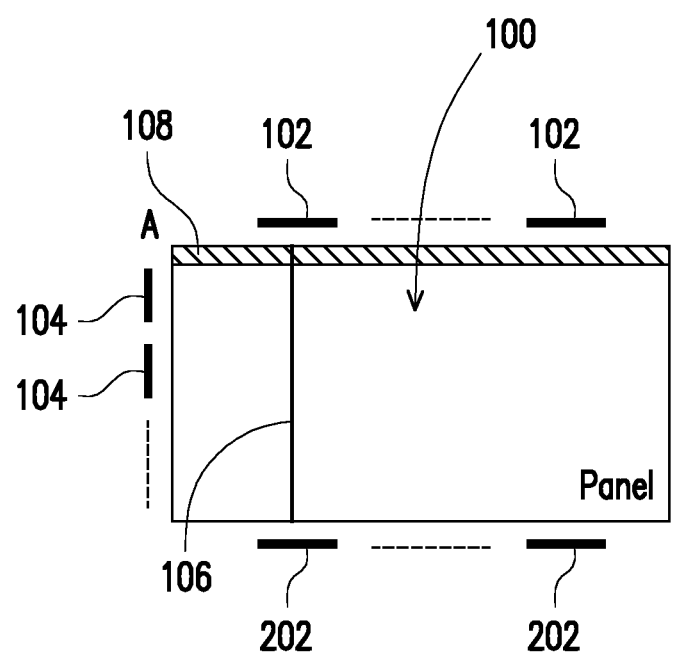
FIG. 16 is a diagram illustrating a liquid crystal display (LCD) according to another embodiment of the invention.

FIG. 16 is a diagram illustrating a liquid crystal display (LCD) according to another embodiment of the invention. Referring to FIGS. 1 and 16, the differences therebetween lie in a plurality of source drivers 202. The source driver 202 outputs a first overdrive voltage (such as voltage OD11 of FIG. 12) and a driving voltage (such as voltage Vf of FIG. 1) to the data line 106, that is, each data line 106 is driven by one of source drivers 102 and one of source drivers 202.

When a voltage level of the first overdrive voltage (such as voltage OD11 of FIG. 12) outputted by the source driver 102 is identical to a voltage level of the first overdrive voltage (such as voltage OD11 of FIG. 12) outputted by the source driver 202, the voltage level of the first overdrive voltage (such as voltage OD11 of FIG. 12) is determined according to a minimum distance of a distance between the receiving pixel and the source driver 102 and a distance between the receiving pixel and the source driver 202. In other words, when the pixel is close to the source driver 102, the voltage level of the first overdrive voltage (such as voltage OD11 of FIG. 12) is determined according to the distance between the receiving pixel and the source driver 102; when the pixel is close to the source driver 202, the voltage level of the first overdrive voltage (such as voltage OD11 of FIG. 12) is determined according to the distance between the receiving pixel and the source driver 202.

When a voltage level of the first overdrive voltage (such as voltage OD11 of FIG. 12) outputted by the source driver 102 is different than a voltage level of the first overdrive voltage (such as voltage OD11 of FIG. 12) outputted by the source driver 202, the voltage level of the first overdrive voltage (such as voltage OD11 of FIG. 12) outputted by the source driver 102 is determined according to the distance between the receiving pixel and the source driver 102, and the voltage level of the first overdrive voltage (such as voltage OD11 of FIG. 12) outputted by the source driver 202 is determined according to the distance between the receiving pixel and the source driver 202.

Figure 17:
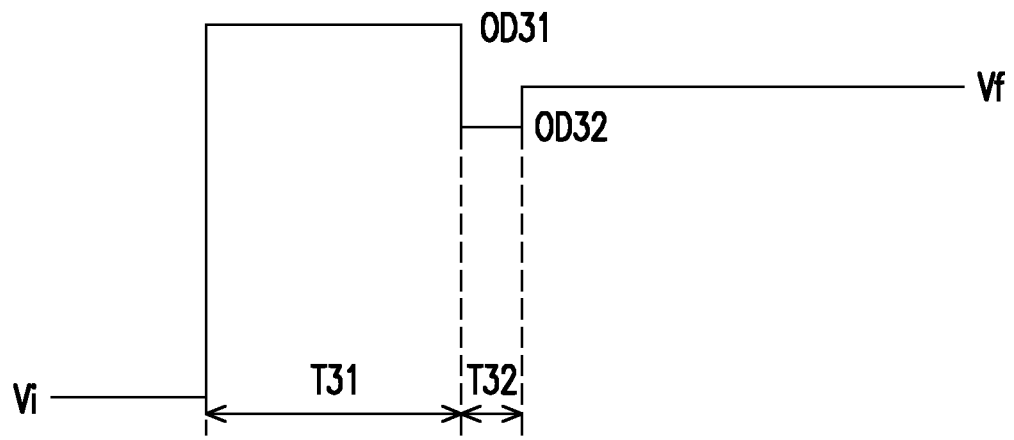
FIG. 17 is a voltage diagram illustrating another overdrive mechanism according to an embodiment of the invention.
Figure 18:
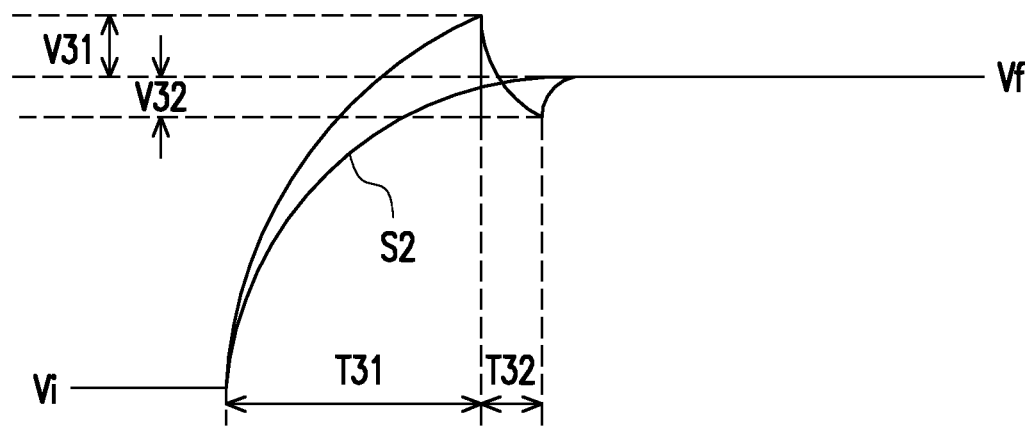
FIG. 18 is a voltage diagram illustrating an actual driving voltage signal applied on a data line using the overdrive mechanism depicted in FIG. 17.

It should be noted that the afore-described overdrive mechanism is not limited to the single segment technique depicted in FIGS. 12 and 13. FIG. 17 is a voltage diagram illustrating another overdrive mechanism according to an embodiment of the invention. FIG. 18 is a voltage diagram illustrating an actual driving voltage signal applied on a data line using the overdrive mechanism depicted in FIG. 17. With reference to FIG. 17, a driving voltage signal supplied by a source driver has a first overdrive voltage OD31 for a first period of time T31, and the driving voltage signal has a second overdrive voltage OD32 for a second period of time T32, in which the first overdrive voltage OD31 is different from the second overdrive voltage OD32, and the length of time T31 is longer than the length of time T32, for instance. In other words, the second overdrive voltage OD32 is supplied between the first overdrive voltage OD31 and the final driving voltage Vf. It should be noted that the first period of time T31 and the second period of time T32 may be configured according to an initial driving voltage Vi and a final driving voltage Vf.

Moreover, the source driver is determining whether the second overdrive voltage OD32 is supplied according to a distance between the receiving pixel and the source driver. For example, when the pixel is close to the source driver, the source driver is determined that the second overdrive voltage OD32 is not supplied; when the pixel is far away from the source driver, the source driver is determined that the second overdrive voltage OD32 is supplied. Moreover, a boundary for whether the second overdrive voltage OD32 is supplied may be determined by design from one of ordinary skill in the art.

As shown in FIG. 18, the overdrive mechanism is applied on a data line of a pixel array, in which a voltage difference V31 exists between the first overdrive voltage OD31 and the final driving voltage Vf, and a voltage difference V32 exists between the second driving voltage OD32 and the final driving voltage Vf applied to the data line, in which the voltage difference V32 is lower than voltage difference V31. As the resistance and capacitance values on the loads of a data line become larger, the actual voltage waveform applied on the pixels approaches the smooth bottom curve S2 shown in FIG. 18, and thereby the pixel array can achieve enhanced refresh performance.

Moreover, it should mentioned that, in the overdrive mechanism depicted in FIGS. 17 and 18, the final driving voltage Vf is higher than the initial driving voltage Vi, and accordingly the first overdrive voltage OD31 is configured to be higher than the final driving voltage Vf and the second overdrive voltage OD32 is configured to be lower than the final driving voltage Vf. However, in other overdrive mechanisms (not drawn), when the final driving voltage Vf is lower than the initial driving voltage Vi, the first overdrive voltage OD31 may also be configured to be lower than the final driving voltage Vf and the second overdrive voltage OD32 may be configured to be higher than the final driving voltage Vf.

Figure 19:
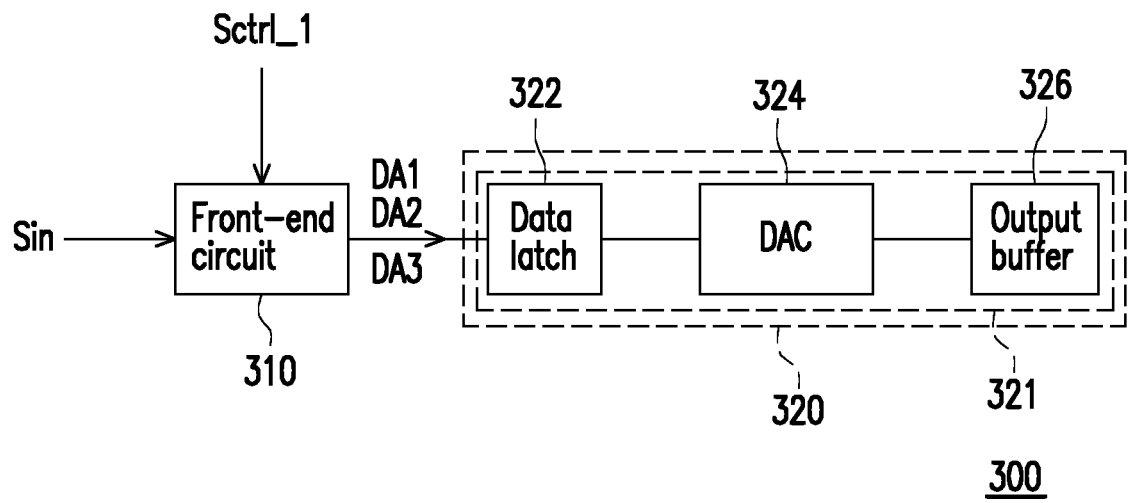
FIG. 19 illustrates a block diagram of a power-saving driving circuit for a display panel according to an embodiment of the invention.

FIG. 19 illustrates a block diagram of a power-saving driving circuit for a display panel according to an embodiment of the invention. Referring to FIG. 19, the power-saving driving circuit 300 of the present embodiment is adapted to drive the pixel array 100 as depicted in FIG. 1 and FIG. 6 for example. In FIG. 6, the display panel has the pixel array 100 and a plurality of scan lines 108 depicted in FIG. 1. The pixel array 100 is grouped into a plurality of pixel regions, and each of the pixel regions includes a plurality of pixels, where a number of the pixel regions is equal to or greater than 2.

In the present embodiment, the power-saving driving circuit 300 includes a front-end circuit 310 and a driving circuit 320. The front-end circuit 310 may include a timing controller (TCON), and the driving circuit 320 may include a source driver 321. The source driver 321 includes a data latch 322, a digital-to-analog converter (DAC) 324 and an output buffer 326. In the present embodiment, the front-end circuit 310 may receive a video signal Sin, and display data thereof may be modified in the front-end circuit 310 to vary the driving capability of the driving voltage, such that the front-end circuit 310 outputs different display data DA1, DA2 and DA3 to the data latch 322. The output buffer 326 may output a plurality of overdrive voltages such as the overdrive voltages OD21, OD22 and OD23 depicted in FIG. 14 according to the display data DA1, DA2 and DA3.

In the present embodiment, the different display data DA1, DA2 and DA3 are corresponding to the different overdrive voltages OD21, OD22 and OD23. For example, the voltage levels of the overdrive voltages OD21, OD22 and OD23 are adjusted according to an identification result of which of the pixel regions corresponding to pixels to be written. In the present embodiment, the front-end circuit 310 receives a control signal Sctr1_1, the pixel region corresponding to the pixel to be written can be identified according to the control signal Sctr1_1. In an embodiment, the control signal Sctr1_1 may be the control signal YDIO of the frame depicted in FIG. 7 or the scan timings of the gate drivers. Any signal capable of indicating the pixel region that the pixel to be written locates may be adopted and serve as the control signal Sctr1_1.

In the present embodiment, a voltage difference between the overdrive voltage OD21, OD22 or OD23 and the driving voltage Vf is getting lower as the pixel region is getting closer to the source driver 321, and the voltage difference is getting higher as the pixel region is getting farther away from the source driver 321. Accordingly, the display data of the video signal Sin is modified in the front-end circuit 310 in the present embodiment. After a constant time, e.g. the first period of time T21 depicted in FIG. 14, the output signal of the output buffer 326 may change from the overdrive voltage OD21, OD22 or OD23 to the driving voltage Vf.

Figure 20:
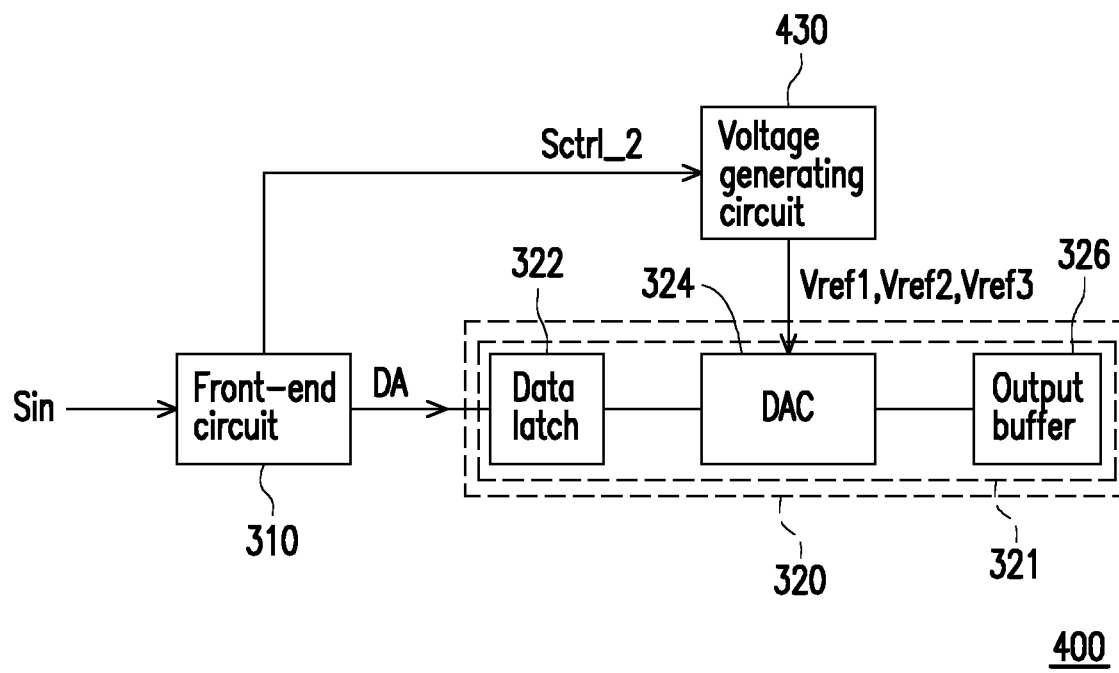
FIG. 20 illustrates a block diagram of a power-saving driving circuit for a display panel according to another embodiment of the invention.

FIG. 20 illustrates a block diagram of a power-saving driving circuit for a display panel according to another embodiment of the invention. Referring to FIG. 20, the power-saving driving circuit 400 of the present embodiment is similar to the power-saving driving circuit 300 depicted in FIG. 19, and the main difference therebetween may, for example, lies in that the power-saving driving circuit 400 further includes a voltage generating circuit 430.

To be specific, the front-end circuit 310 outputs the display data DA and a control signal Sctr1_2 to the data latch 322 and the voltage generating circuit 430, respectively. In the present embodiment, the control signal Sctr1_2 indicates the pixel region that the pixel to be written locates. Any signal capable of indicating the pixel region that the pixel to be written locates may be adopted and serve as the control signal Sctr1_2. For example, the voltage generating circuit 430 receives the control signal Sctr1_2 from the front-end circuit 310 and generates reference voltages Vref1, Vref2 and Vref3 to the digital-to-analog converter 324. The digital-to-analog converter 324 outputs the overdrive voltage OD21, OD22 or OD23 according to the reference voltage Vref1, Vref2 or Vref3. The different overdrive voltages OD21, OD22 and OD23 are corresponding to the different reference voltages Vref1, Vref2 and Vref3. Accordingly, the output buffer 326 may output the overdrive voltage OD21, OD22 or OD23 according to the pixel region that the pixel to be written locates.

In the present embodiment, the front-end circuit 310 may dynamically control the voltage generating circuit 430 to output the reference voltage Vref1, Vref2 or Vref3 to the digital-to-analog converter 324 to vary the driving capability of the driving voltage according to the reference voltage Vref1, Vref2 or Vref3. The output buffer 326 may output the overdrive voltage OD21, OD22 or OD23 according to the pixel region that the pixel to be written locates during a predetermined time, e.g. the first period of time T21 depicted in FIG. 14. After the predetermined time, the output signal of the output buffer 326 may change from the overdrive voltage OD21, OD22 or OD23 to the driving voltage Vf. It is noted that the digital-to-analog converter 324 may output the overdrive voltage OD21, OD22 or OD23 by unitizing different mechanism in other embodiments. The reference voltages Vref1, Vref2 and Vref3 may be other voltages or currents capable of causing or controlling the digital-to-analog converter 324 to output different overdrive voltages.

Figure 21:
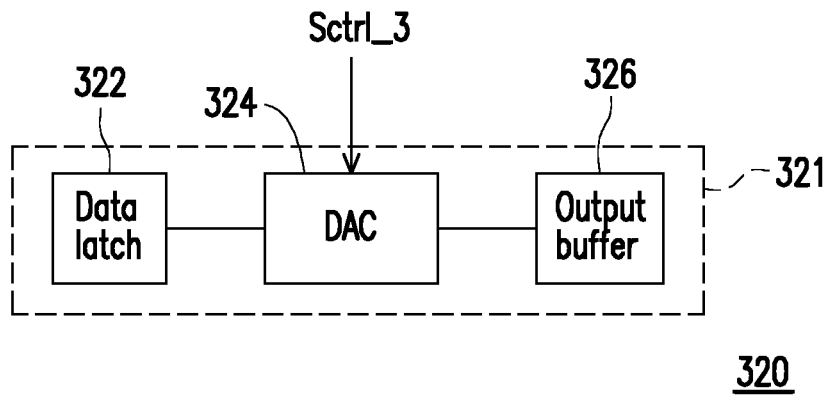
FIG. 21 illustrates a block diagram of a power-saving driving circuit for a display panel according to another embodiment of the invention.

FIG. 21 illustrates a block diagram of a power-saving driving circuit for a display panel according to another embodiment of the invention. Referring to FIG. 21, the power-saving driving circuit of the present embodiment is similar to the power-saving driving circuit 400 depicted in FIG. 20, and the main difference therebetween may, for example, lies in that the digital-to-analog converter 324 of the present embodiment receives a control signal Sctr1_3 from the front-end circuit 310 or another external circuit directly. The digital-to-analog converter 324 may output an overdrive voltage OD21, OD22 or OD23 according to the control signal Sctr1_3 so as to vary the driving capability of the driving voltage according to the overdrive voltage OD21, OD22 or OD23.

To be specific, the control signal Sctr1_3 indicates the pixel region that the pixel to be written locates in the present embodiment. Any signal capable of indicating the pixel region that the pixel to be written locates may be adopted and serve as the control signal Sctr1_3. The digital-to-analog converter 324 depicted in FIG. 21 receives the control signal Sctr1_3 from the front-end circuit 310. The digital-to-analog converter 324 may increase an initial driving voltage Vi by a voltage difference to generate the overdrive voltage OD21, OD22 or OD23 as depicted in FIG. 14 when converting the display data DA of a digital format into the display data DA of an analog format. Accordingly, the output buffer 326 may output the overdrive voltage OD21, OD22 or OD23 according to the pixel region that the pixel to be written locates. After a predetermined time, e.g. the first period of time T21 depicted in FIG. 14, the output signal of the output buffer 326 may change from the overdrive voltage OD21, OD22 or OD23 to the driving voltage Vf.

Figure 22:
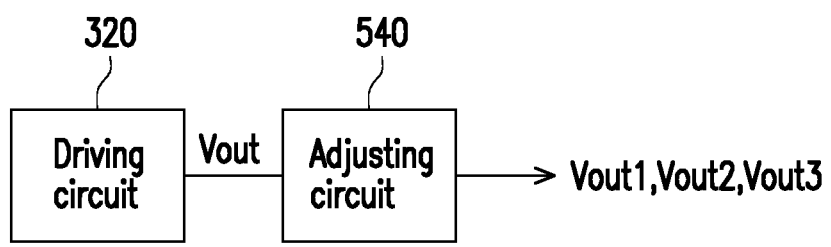
FIG. 22 illustrates a block diagram of a power-saving driving circuit for a display panel according to another embodiment of the invention.

FIG. 22 illustrates a block diagram of a power-saving driving circuit for a display panel according to another embodiment of the invention. Referring to FIG. 22, the power-saving driving circuit of the present embodiment may further include an adjusting circuit 540 coupled to the driving circuit 320. The adjusting circuit 540 may be arranged out of the driving circuit 320 in the present embodiment. Alternatively, the adjusting circuit 540 may be arranged inside the driving circuit 320.

For example, the adjusting circuit 540 is configured to adjust an original output voltage Vout from the driving circuit 320 to output different adjusted output voltages such as Vout1, Vout2 or Vout3 so as to vary the driving capability of the driving voltage. The adjusted output voltages may be determined according to the overdrive voltage OD21, OD22 and OD23, respectively. The adjusting circuit 540 adjusts the same output voltage Vout, which may be the initial driving voltage Vi, to the different output voltage Vout1, Vout2 or Vout3 according to the pixel region that the pixel to be written locates. In other embodiments, the adjusting circuit 540 may also generate and output the different output voltage Vout1, Vout2 or Vout3 without performing an adjustment process on an original output voltage. In summary, the different adjusted output voltages Vout1, Vout2 and Vout3 are corresponding to the different overdrive voltage OD21, OD22 or OD23. It is noted that the adjusting circuit 540 may adjust the original output voltage Vout for a predetermine time and output the original output voltage Vout after the predetermined time.

In view of above, a power-saving driving method is proposed for a display panel, adapted to drive a pixel array, wherein the pixel array comprises a plurality of driving lines divided into a plurality of pixel regions comprising a first region and a second region, and the driving lines are driven by at least one display driver. The power-saving driving method comprising: When the at least one display driver charges/discharges a first pixel region of the driving lines farther away from the at least one display driver, maintaining a first charge driving capability of an output of the at least one display driver can be maintained to allow the driving lines to have a proper level of charges at the first pixel region. When the at least one display driver charges/discharges a second pixel region of the driving lines nearer the at least one display driver, a second charge driving capability of the output of the at least one display driver can be maintained to allow the driving lines to have a proper level of charges at the second pixel region. The second charge driving capability is weaker than the first charge driving capability.

In view of the foregoing, according to an embodiment of the invention, near and far loads on a display panel are driven with different driving capabilities or different charge areas, so that when pixels at a near end are driven, the parasitic capacitors and storage capacitors at a far end need not to be fully charged. Accordingly, fewer charges are converted and a power-saving effect is achieved.

Based on the same mechanism, the application of the invention is not limited to the LCD. Instead, the invention may also be applied to other light emitting diode (LED) displays. The invention can be applied to a regular display panel having a pixel array, and the pixels are driven with scan lines and data lines. The invention can be applied not only to source drivers but any types of display driver.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A power-saving driving circuit for a display panel, wherein the display panel comprises a pixel array comprising a plurality of data lines, wherein the data lines are grouped into a plurality of pixel regions according to a scan time, and each of the pixel regions has a plurality of pixels, the power-saving driving circuit comprising:
   at least one source driver respectively supplying a driving voltage to the pixels on at least one of the data lines,
   wherein the driving voltage supplied by the at least one source driver to each of the pixel regions has a varying driving capability, and the driving capability of the driving voltage is larger when the driving voltage is supplied for driving the pixels in the pixel region farther from the at least one source driver,
   wherein the varying driving capability is determined according to at least a pulse width of the driving voltage, and the pulse width of the driving voltage is larger when the driving voltage is supplied for driving the pixels in the pixel region farther from the at least one source driver,
   wherein the pulse width is controlled by a clock signal received by the at least one source driver,
   wherein the clock signal has a first pulse width and a second pulse width that are alternatively produced, and the first pulse width varies with the driving capability,
   wherein a rising edge of the pulse width of the driving voltage is determined by the first pulse width, a falling edge of the pulse width of the driving voltage is determined by the second pulse width.

2. The power-saving driving circuit according to claim 1, wherein a number of the pixel regions is at least 3.

* * * * *